US00RE47734E

(19) United States
(12) Reissued Patent
Jeon et al.

(10) Patent Number: US RE47,734 E
(45) Date of Reissued Patent: Nov. 19, 2019

(54) METHOD AND APPARATUS FOR LOCATION BASED CALL SIGNAL CONVERSION SERVICE IN A WIRE-LESS COMMUNICATION NETWORK

(71) Applicant: Samsung Electronics Co., Ltd., Suwon-si, Gyeonggi-do (KR)

(72) Inventors: Young Ki Jeon, Hwaseong-si (KR); Min Su Kim, Hwaseong-si (KR); Shi Jae Lee, Suwon-si (KR)

(73) Assignee: Samsung Electronics Co., Ltd., Suwon-si (KR)

(21) Appl. No.: 14/680,662

(22) Filed: Apr. 7, 2015

Related U.S. Patent Documents

Reissue of:

(64) Patent No.: 8,649,802
Issued: Feb. 11, 2014
Appl. No.: 13/063,545
PCT Filed: Sep. 10, 2009
PCT No.: PCT/KR2009/005140
§ 371 (c)(1),
(2) Date: Mar. 11, 2011
PCT Pub. No.: WO2010/030126
PCT Pub. Date: Mar. 18, 2010

(30) Foreign Application Priority Data

Sep. 12, 2008 (KR) ..... 10-2008-0090392

(51) Int. Cl.
*H04W 24/00* (2009.01)
*H04M 3/42* (2006.01)
*H04L 29/06* (2006.01)

(52) U.S. Cl.
CPC ..... *H04M 3/42263* (2013.01); *H04L 65/105* (2013.01); *H04L 65/1006* (2013.01);
(Continued)

(58) Field of Classification Search
CPC ..... H04W 4/02; H04W 64/00; H04W 4/021; H04W 4/04; H04W 48/04; H04M 3/54;
(Continued)

(56) References Cited

U.S. PATENT DOCUMENTS 5,675,629 A * 10/1997 Raffel ..... H04W 16/16 370/280
6,038,451 A * 3/2000 Syed ..... H04M 3/54 455/417

(Continued)

FOREIGN PATENT DOCUMENTS

KR 10-2002-0043276 A 6/2002
KR 10-2005-0054539 A 6/2005

(Continued)

*Primary Examiner* — Charles R Craver
(74) *Attorney, Agent, or Firm* — Jefferson IP Law, LLP

(57) ABSTRACT

The present invention relates to an apparatus and method for location based call signal conversion in a wireless communication network. The location based call signal conversion apparatus comprises an LBS (Location Based Service) server that provides location information on user terminals, and a call signal conversion server that converts the called signal to anyone called terminal on the called target terminal list that has been set up according to the current location of said called user terminal if a call connection request to a receiving user terminal from a sending user terminal is sensed among said user terminals, and if conditions for call signal conversion are satisfied according to the location and state of said called user terminal.

20 Claims, 8 Drawing Sheets

(52) U.S. Cl.
CPC ..... *H04L 65/1016* (2013.01); *H04L 65/80* (2013.01); *H04M 3/42357* (2013.01); *H04M 2242/30* (2013.01)

(58) Field of Classification Search
CPC ..... H04M 3/42348; H04M 3/42365; H04M 3/42263; H04M 3/42357; H04M 2242/30; H04L 65/1006; H04L 65/105; H04L 65/80; H04L 65/1016
See application file for complete search history.

(56) References Cited

U.S. PATENT DOCUMENTS 6,195,558 B1 * 2/2001 Griffith ..... H04W 8/26 455/456.5
6,584,316 B1 * 6/2003 Akhteruzzaman .... H04W 36/32 455/417
6,591,115 B1 * 7/2003 Chow ..... H04W 76/15 455/555
6,775,546 B1 * 8/2004 Fuller ..... H04W 40/20 455/445
6,856,806 B1 * 2/2005 Bosik ..... H04M 3/42229 455/445
7,006,833 B1 * 2/2006 Contractor ..... H04M 3/42263 379/211.01
7,013,003 B2 * 3/2006 Seligmann ..... H04W 4/029 379/211.02
7,082,306 B2 * 7/2006 Himmel ..... H04M 3/42 379/211.01
7,215,968 B2 * 5/2007 Fujiwara ..... 455/456.3
7,551,920 B1 * 6/2009 Ngan ..... H04M 1/72516 455/417
8,229,471 B1 * 7/2012 Kirkham ..... H04W 8/28 455/456.1
2002/0045456 A1 * 4/2002 Obradovich ..... H04W 4/029 455/457
2003/0003900 A1 * 1/2003 Goss ..... H04M 3/54 455/417
2003/0045276 A1 * 3/2003 Bondy ..... H04M 3/42153 455/419
2003/0100319 A1 * 5/2003 Contractor ..... H04M 3/54 455/461
2004/0203899 A1 * 10/2004 Curtis ..... H04M 1/72577 455/456.1
2005/0053221 A1 * 3/2005 Reding ..... H04M 3/436 379/211.02
2005/0054335 A1 * 3/2005 Pearson ..... H04M 3/54 455/417
2005/0063528 A1 * 3/2005 Pearson ..... H04M 3/54 379/211.01
2005/0277431 A1 * 12/2005 White ..... H04W 8/04 455/466
2006/0099934 A1 * 5/2006 Song ..... H04Q 3/0045 455/412.2
2006/0116115 A1 * 6/2006 Lee ..... H04M 3/42357 455/417
2007/0280445 A1 * 12/2007 Shkedi ..... H04L 12/66 379/93.23
2008/0004002 A1 * 1/2008 Chin ..... H04W 4/16 455/425
2008/0299957 A1 * 12/2008 Zellner ..... 455/414.3
2009/0233623 A1 * 9/2009 Johnson ..... H04W 4/023 455/456.3
2012/0027192 A1 * 2/2012 Contractor ..... 379/211.02

FOREIGN PATENT DOCUMENTS

KR 10-2005-0076531 A 7/2005
KR 10-2007-0052373 A 5/2007

* cited by examiner

METHOD AND APPARATUS FOR LOCATION BASED CALL SIGNAL CONVERSION SERVICE IN A WIRE-LESS COMMUNICATION NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a call forwarding method and apparatus for a wireless communication network and, in particular, to a method and apparatus for providing a call forwarding service based on the location of a called terminal.

BACKGROUND ART

IMS (IP multimedia Subsystem) is an open architecture for providing IP multimedia services in mobile, fixed, and mobile-fixed convergence environment on the basis of SIP (Session Initiation Protocol) signaling. In the IMS architecture, it is possible to create, control, and modify an application regardless of the type of network or platform and implement the communication of multimedia and other large volume data efficiently. In an exemplary IMS-based communication system, it is possible for the mobile users to participate in a real time group communication supporting one-to-many conversation, a bidirectional mobile game, and Instant Messaging (IM) service. Meanwhile, the concept of Internet web browser running in the Personal Computer (PC) can be adopted to various mobile communication devices. The ultimate purpose of the IMS is to allow the users to access the target contents and services with all the types of networks and devices.

Since the call forwarding service of the conventional IMS is targeted for the Circuit Switching (CS) service in the IMS, it provides the number of transfer-target terminal as the number of the recipient terminal. For example, the SIP URI or TEL URI of the transfer target terminal is provided to the calling terminal. In addition to this basic call forwarding service, since the IMS has the architecture suitable for devising a new service by converging various services, it is required to develop new services capable of extending the CS services.

DISCLOSURE

Technical Problem

In order to fulfill the requirements, the present invention provides a location-based call forwarding method and apparatus of a wireless network system that is capable of providing location-based call forwarding service by extending conventional call forwarding service in the IMS network.

Technical Solution

In accordance with an aspect of the present invention, a location-based call forwarding apparatus of a wireless communication network includes an LBS (Location Based Service) server which collects and provides location information of user terminals; and a call forwarding server which determines, when a calling terminal request a called terminal for a call establishment, whether to perform call forwarding by comparing a call forwarding region as a reference region for determining call forwarding with location of the called terminal and forwards, when the call forwarding is determined, a call destined to the called terminal to one of candidate terminals in a call forwarding-target terminal list.

Preferably, the call forwarding region is defined by a predetermined distance from a position.

Preferably, the call forwarding server determines the call forwarding when the called terminal is within the predetermined distance from the position.

Preferably, the call forwarding server determines whether to perform the call forwarding according to a state of the called terminal as well as the location of the called terminal.

Preferably, the state can be any of a first state in which the call forwarding is performed forcibly regardless of the state of the called terminal, a second state in which the call forwarding is performed when the called terminal is not registered with the network, and a third state in which the call forwarding is performed when the called terminal does not accept the call.

In accordance with another aspect of the present invention, a location-based call forwarding method of a wireless communication network includes collecting, a calling terminal requests a called terminal a call establishment, location information of the called terminal; determining whether to perform call forwarding by comparing a call forwarding region as a reference region for determining call forwarding with location of the called terminal; and forwarding, when the call forwarding is determined, a call destined to the called terminal to one of candidate terminals in a call forwarding-target terminal list.

Preferably, the call forwarding region is defined by a predetermined distance from a position.

Preferably, determining comprises deciding the call forwarding when the called terminal is within the predetermined distance from the position.

Preferably, determining comprises judging whether to perform the call forwarding according to a state of the called terminal as well as the location of the called terminal.

Preferably, the state can be any of a first state in which the call forwarding is performed forcibly regardless of the state of the called terminal, a second state in which the call forwarding is performed when the called terminal is not registered with the network, and a third state in which the call forwarding is performed when the called terminal does not accept the call.

Advantageous Effects

The location-based call forwarding method and apparatus of the present invention determines call forwarding based on the state or location of the called terminal and selects the call forwarding-target terminal according to the location of the called terminal, thereby providing the call forwarding service more efficiently. As a consequence, it is possible to improve the utilization of the wireless communication network.

MODE FOR INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
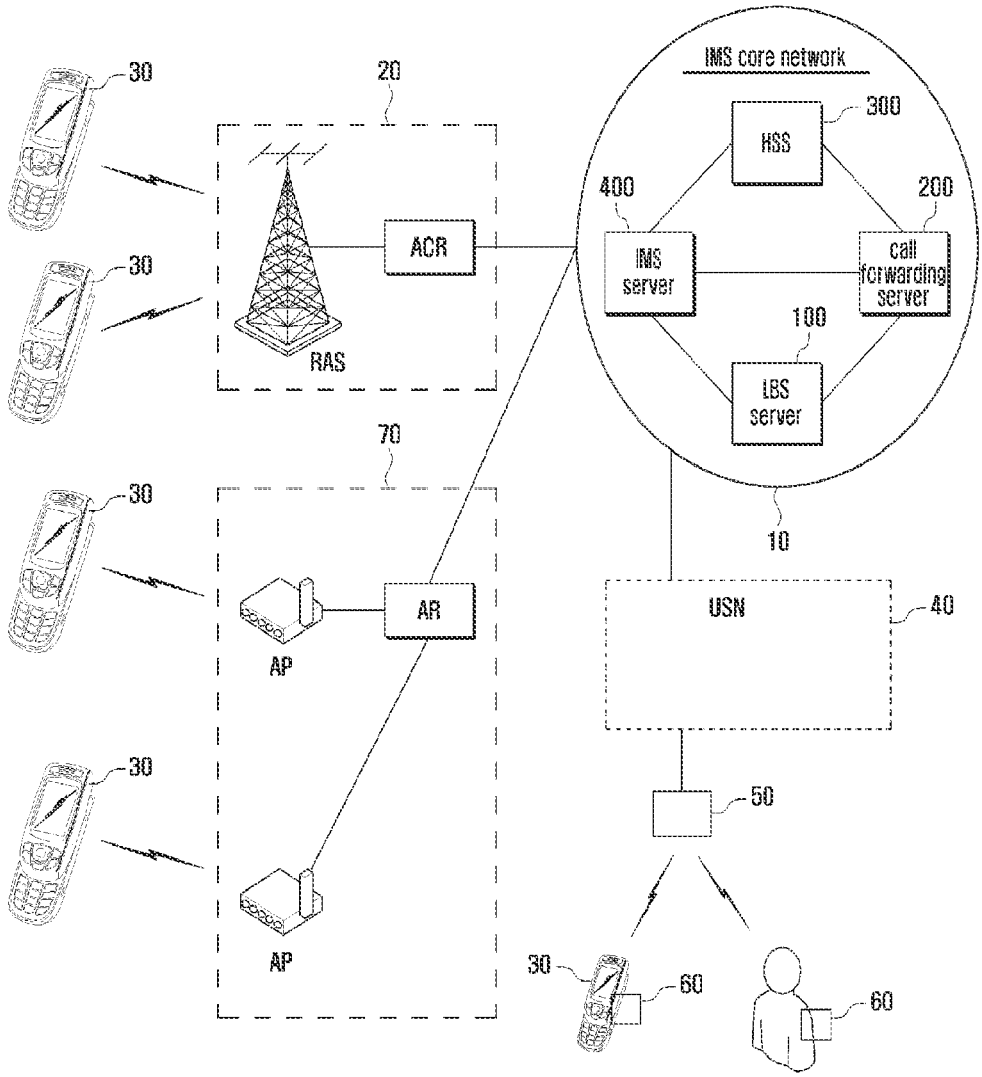
FIG. 1 is a diagram illustrating a configuration of a wireless network system according to an embodiment of the present invention.

First of all, a description is made of the wireless network system according to an embodiment of the present invention. FIG. 1 is a diagram illustrating a configuration of a wireless network system according to an embodiment of the present invention.

The wireless network system according to an embodiment of the present invention includes an IMS (IP Multimedia System) core network 10, a base station device 20, user terminals 30, USN (Ubiquitous Sensor Network) 40, an RFID (Radio Frequency) reader 50, an RFID sensor 60, and a WLAN 70.

The user terminal 30 is an endpoint of a wireless channel and communicates with the base station device 20 according to a radio access protocol. The user terminal 30 according to an embodiment of the present invention supports SIP (Session Initiation Protocol) and connects to a counterpart terminal. In an embodiment of the present invention, the user terminal 30 which transmits an INVITE message to establish a connection with a counterpart terminal according to the SIP is referred to as "calling terminal," and the user terminal receiving the INVITE message is referred to as "called terminal." Also, according to an embodiment of the present invention, the user terminal to which a call forwarding is made, when the called terminal is positioned at a specific location or in a specific state, is referred to as "call forwarding-target terminal."

The base station device 20 is responsible for making establishment of a connection between the user terminal 30 and the IMS core network 10. Particularly, the base station device 20 includes a RAS (Radio Access Station) 210 and an ACR (Access Control Router) 220. The RAS (Radio Access Station) 210 is an entity for coupling a wireless network to a wired network and responsible for controlling the radio channel in consideration of the network characteristics and providing wireless packet data service to the user terminal 30 directly in the state connected to the wired network. Its main functions include transmitting/receiving radio signals, modulating/demodulating packet traffic signals, and protocol processing and routing. The ACR (Access Control Router) 220 is connected to and controls a plurality of RASs 210 and controls handover for guaranteeing high speed mobility in the ACR 220. The ACR 220 controls the user terminals 30 and RASs 210 and is responsible for routing IP packets. In view of data traffic, the ACR 220 can be shown as a router.

According to another embodiment of the present invention, the role of the base station device 20 can be replaced by an AP (Access Point) and an AR (Access Router) in the WLAN (Wireless Local Area Network) 70.

The USN 40 collects location information provided from the RFID sensor 60 to the RFID reader 50 and provides the collected information to the LBS server 100 of the IMS core network 10.

At this time, the RFID sensor 60 can be included in the user terminal 30 or separately carried by the user to provide the terminal's location information.

According to an embodiment of the present invention, the IMS (IP Multimedia Subsystem) core network (hereinafter, called just "IMS") 10 is the Core Network infrastructure that is capable of various multimedia service based on the IP (Internet Protocol).

The IMS 10 can include various entities, and a set of the entities can be collectively called as IMS 10. According to an embodiment of the present invention, the IMS (IP Multimedia Subsystem) 10 includes an LBS (Location Based Service) server 100, a Call forwarding logic server 200, an HSS (Home Subscriber Server) 300, and an IMS server 400.

The LBS server 100 is an application server for providing the location-based services in which the location of a person or object is checked accurately and provided based on the communication network. That is, the LBS server 100 measures the location of the user or the user terminal 30 and provides the IMS 10 with the location information.

The LBS server 100 can measure the location using (1) RFID (Radio Frequency Identification) Tag, (2) BS (Base station), or (3) GPS satellite.

The RFID-based method provides the location information read out from the RFID sensor. The RFID sensor 60 can be categorized into one of active and passive sensors. The active RFID sensor has its own transmitter, and the passive RFID sensor 60 reflects the electric wave energy transmitted by the RFID reader 50 without its own transmitter. The RFID sensor 60 is carried by the user or attached to the user terminal 30 so as to collect the location of the user or the user terminal by means of the RFID reader 50 and the USN 40.

The BS-based method can measure the location of the user within the error range of 500~1500 m around the base station which the subscriber has accessed. Also, the location of the user can be measured with triangulation using three base stations. A cell-based method, although it is only possible to check the location roughly due to the large error range, is advantageous to locate the user even in the building and basement using repeaters. The base station can be the RAS of the base station device 20 or the AP of the WLAN 70.

The GPS satellite-based method can locate the user accurately within the error range of 10~150 m with the assistant of the GPS chip but has a defect that it is useless inside of the building or at the area filled with tall buildings due to the reflective and refractive characteristics of satellite signal. According to an embodiment of the present invention, the location information received from the GPS satellite is provided to the LBS server 100 of the IMS Core Network 10.

If the calling terminal requests for call establishment (or session establishment), the call forwarding logic server 200 forwards the call to the call forward target terminal according to the location or state of the called terminal.

The call forwarding logic server 200 can be an Application Server (AS). According to an embodiment of the present invention, the call forwarding logic server 200 performs call forwarding and provides an interface to the IMS server (particularly, S-CSCF) using SIP.

As aforementioned, the IMS core network 10 includes various entities of which the entity related to the SIP (Session Initiation Protocol) network can be any of P-CSCF, I-CSCF, S-CSCF, and HSS 300. Here, the P-CSCF, I-CSCF, and S-CSCF are collectively referred to as IMS server 400.

In short, the IMS server 400 is an SIP server which processes the SIP signal in the IMS 10. That is, the IMS server 400 processes the SIP signals exchanged for establishing a session between the calling and called terminals. The SIP signals include INVITE message, 108 ring message, and 200 OK message.

The P-CSCF is a SIP proxy server as the initial connection point for the user terminal 30. The P-CSCF can exist in a home network or a visited network. The P-CSCF is assigned to the user terminal in the IMS core network registration process and does not changed during the registration period. The P-CSCF can include a PDF or implemented separately and is responsible for the QoS (Quality of Service) control such as policy control and bandwidth management. The I-CSCF is positioned, when a border function is not supported, at the boundary of a management domain. Accordingly, the IP address is notified to the DNS of the domain such that the server of other domain can find and use the I-CSCF as the entry node of the network. The I-CSCF makes a query on the user location to the HSS 300 and transmits SIP message to the S-CSCF. The S-CSCF is a SIP server as a center node of signaling layer and performs session control. The S-CSCF is always positioned in the home network and uploads and downloads user profile to and from the HSS. In the SIP registration process, the S-CSCF binds the user location and SIP address.

Until now, the description has been made of the configurations of the entities of the IMS core network 10, and detailed descriptions on other entities are omitted to avoid obscuring the subject matter of the present invention.

Figure 2:
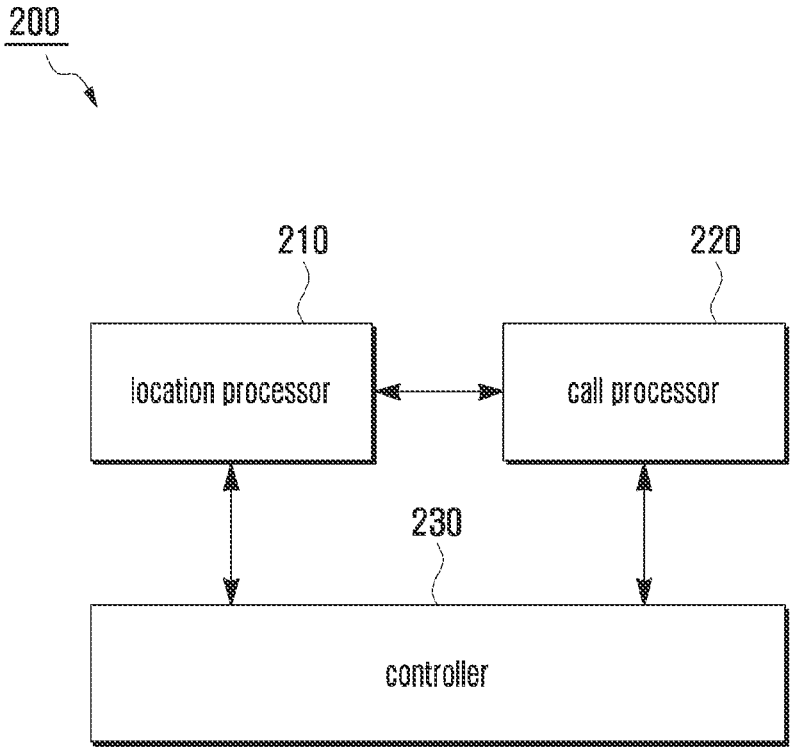
FIG. 2 is a diagram illustrating a configuration of the call forwarding server according to an embodiment of the present invention.

A description is made of the call forwarding server 200 according to an embodiment of the present invention. FIG. 2 is a diagram illustrating a configuration of the call forwarding server according to an embodiment of the present invention.

The call forwarding server 200 according to an embodiment of the present invention includes a location processor 210 for processing the information on the location of the subscriber or user terminal 30, a call processor 220 for processing call forwarding based on the location and state information, and a controller 230 for controlling the location processor 210 and the call processor 220 to cooperate for the call forwarding based on the location and state information.

The controller 230 notifies the location processor 210 and the call processor 220 of the configuration and fulfillment of call forwarding conditions. Here, the call forward conditions can include at least one of the location and state of the user terminal. The location means the position of the user terminal in relation to a preset call receipt region for performing the call forwarding, and the state includes CFU (Call Forwarding Unconditional), CFNL (Call Forwarding Not Logged-in), CFNR (Call Forwarding on No Reply).

The location processor 210 is responsible for the location-related information of the user terminal 30. For this purpose, the location procession 110 requests the LBS server 100 for the location of the user terminal 30 or the user and receives the location information provided by the LBS.

The location processor 210 also provides the call processor 220 with the call receipt region of the user terminal 30. The location processor 210 also can provide the call processor 120 with the list of preset candidate user terminals (User Equipments or UEs) according to the call receipt region corresponding to the current location.

The call processor 220 performs the call forwarding function based on the state and/or location of the user terminal 30. For this purpose, the call processor 220 configures the call forwarding condition according to the location and/or state of the called terminal and monitors to detect an event occurred by the fulfillment of the condition.

As aforementioned, the location means the current position of the user terminal in relation to the call receipt region. The call receipt region is a reference region set for determining whether to perform call forwarding or not. Also, the types of state include CFU, CFUN, and CFNR. Accordingly, the call processor 220 receives the current location of the user terminal 30 from the location processor 210 and acquires the list of the candidate call forwarding-target UEs from the location processor 210 according to the current location of the subscriber and user terminal 30. Next, the call processor 220 performs call forwarding to the user terminals 30 as the candidate UEs for the call destined to the subscriber.

The controller 230 controls the location processor 210 and the call processor 220 for performing the call forwarding operation according to the location and/or state of the called terminal.

Figure 3:
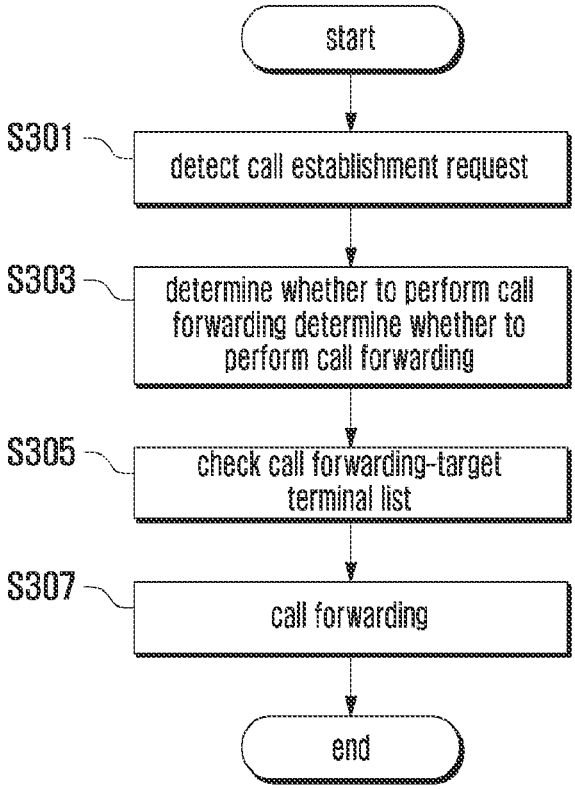
FIG. 3 is a flowchart illustrating a location-based call forwarding method according to an embodiment of the present invention.

A description is made of the location-based call forwarding method according to an embodiment of the present invention. FIG. 3 is a flowchart illustrating a location-based call forwarding method according to an embodiment of the present invention.

In FIG. 3, it is assumed that the first user terminal 31 is the calling terminal, and the second user terminal 32 is the called terminal.

Referring to FIG. 3, the call forwarding server 200 detects a call establishment (session establishment) request from the first user terminal to the second user terminal at step S301. According to SIP, the first user terminal 31 sends an INVITE message for call establishment request to the IMS core network 10 via the base station device 20. The INVITE message includes the identifier of the first user terminal 31 and the identifier of the second user terminal 32. Here, the identifier can be a SIP URI or a TEL URI.

Upon receipt of the call establishment request, the call forwarding server 200 determines whether to perform call forwarding in consideration of the current location or state of the second user terminal 32 at step S305. Also, the call forwarding server can determine whether to forward the call or not based on both the current location and state of the called terminal. A description is made of the method for determining the current location and current state of the called terminal.

In order to perform the call forwarding, the call forwarding server 200 checks the candidate call forwarding-target terminal list of the second user terminal 32 at step S305. The call forwarding-target terminal list is configured with the mappings according to the current location (when INVITE message is receiving) of the second user terminal 32.

Next, the call forwarding server 200 forwards the call to at least one of the candidate terminals in the call forwarding-target terminal list at step S307.

The location-based call forwarding method according to an embodiment of the present invention is described in more detail. FIGS. 4 to 7 are diagrams illustrating a method for providing the call forwarding service based on the current location according to an embodiment of the present invention.

Figure 4:
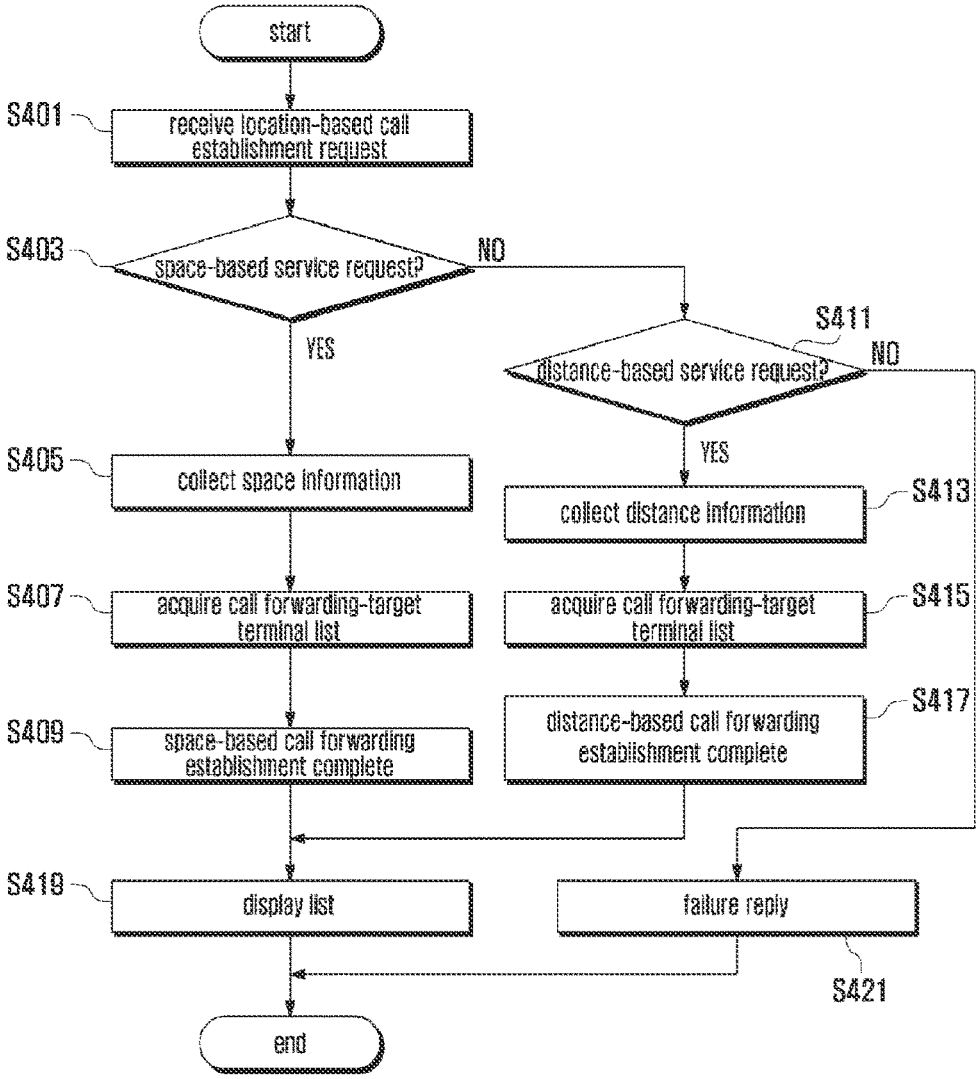
FIGS. 4 to 7 are diagrams illustrating a method for providing the call forwarding service based on the current location according to an embodiment of the present invention.

In FIG. 4, the user terminal 30 is assumed as the called terminal. Referring to FIG. 4, the call forwarding server 200 receives a location-based call forwarding establishment request transmitted by a user terminal 30 at step 401. The user terminal 30 can access the call forwarding server 200 via the base station device and IMS server 400, and it is preferred that this process is performed based on SIP. The location-based call forwarding establishment can be categorized into one of a space-based call-forwarding establishment and a distance-based call forwarding establishment, as described hereinbelow in detail.

Upon receipt of the location-based call forwarding establishment request, the call forwarding server 200 determines whether the location-based call forwarding establishment request is a space-based service request or a distance-based service request at step S403. If the location-based call forwarding establishment request is the space-based service request, the call forwarding server 200 goes to step S405 and, otherwise, goes to step S411.

Figure 5:
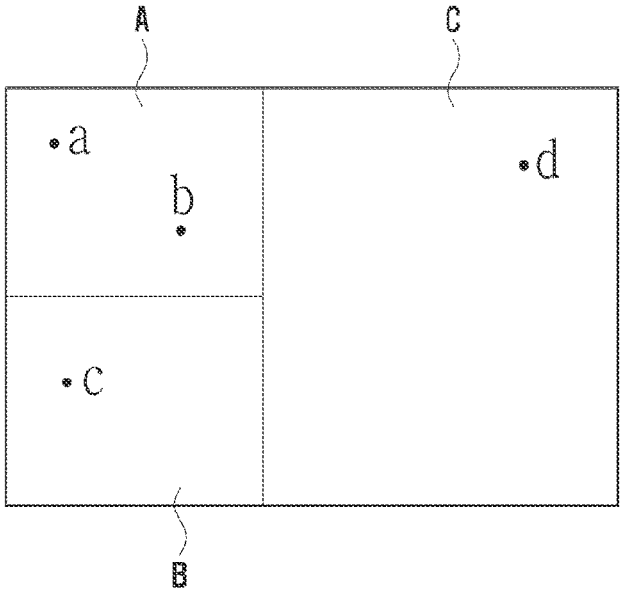
Figure 6:
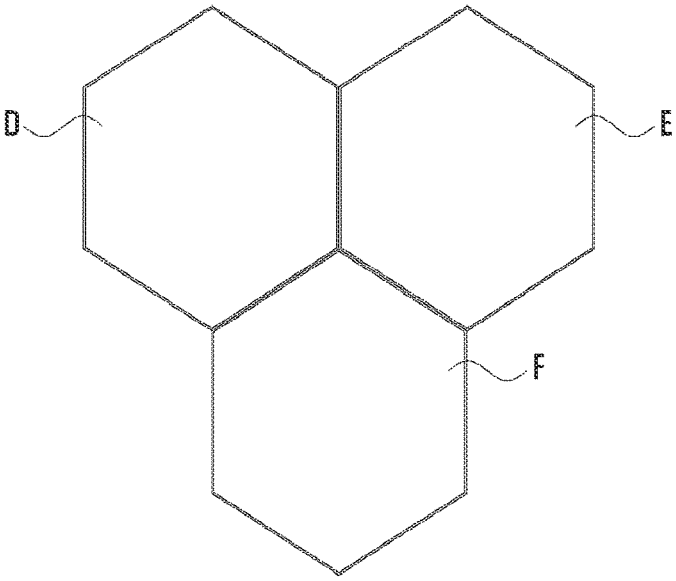

At step S405, the call forwarding server 200 collects space information from the LBS server 100. Here, the space information is the information indicating the space where the user terminal 30 is located in a predetermined space. The space information is exemplarily illustrated in FIGS. 3b and 3c. FIG. 5 shows spaces A, B, and C. Here, the spaces A, B, and C are the spaces predefined according to the internal design of a specific building. When the user terminal 30 is located at any of the spaces A, B, and C, the LBS server 100 provides the information on the location where the user terminal 30 is positioned. For example, if the user terminal 30 locates at the position "a" or "b", the LBS server 100 provides the location information indicating the region A. Also, if the user terminal 30 locates at the position "c" or "d", the LBS server 100 provides the location information indicating the location B or C. FIG. 6 shows an exemplary case where the space is divided into multiple unit spaces. FIG. 4c shows spaces D, E, and F.

After collecting the space information, the call forwarding server 200 acquires the call forwarding-target terminal (candidate UE) list when the user terminal is located in the corresponding space at step S407. The call forwarding-target terminal list can be provided by the user terminal 30. That is, the call forwarding-target terminal can be the terminal having the phone number input by the user directly. Such space information is useful, when the user terminal 30 is located in a specific space, to forward the call to another terminal in the same space. Assuming that the called user terminal 30 locates at position b and the space A is a discuss room, it is possible to register the terminals located in the discussion room with the call forwarding-target terminal list. Next, the call forwarding server 200 maps the space including the current location of the user terminal to the call forwarding-target terminal list according to the corresponding to the space and saves the mapping and completes the space-based call forwarding establishment process at step S409. Accordingly, when the user terminal 30 is located in a predefined space, the call destined to the user terminal 30 can be forwarded to at least one of the user terminals in the call forwarding-target terminal list.

If the location-based call forwarding establishment request is not the space-based service request at step S403, the call forwarding server 200 determines whether the location-based call forwarding establishment request is the distance-based service request at step S411.

If the location-based call forwarding establishment request is the distance-based service request, the call forwarding server 200 goes to step S413. Otherwise, if the location-based call forwarding establishment request is not the distance-based service request, the call forwarding server 200 replies that the call forwarding establishment request has failed.

At step S413, the call forwarding server 200 acquires the distance information from the LBS server 100. Here, the distance information means the information on the preset distance from the location of the user terminal 30.

Figure 7:
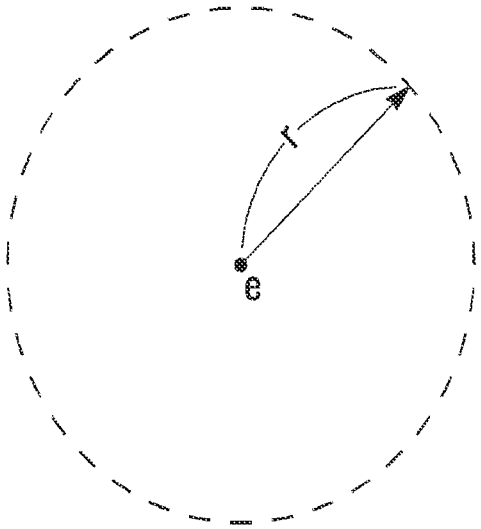

The distance information is exemplarily illustrated in FIG. 7. In FIG. 7, it is assumed that the user terminal is located at position "e". In this case, the distance information includes the position "e" and the radius "r" of a circle around position "e".

After collecting the distance information, the call forwarding server 200 acquires the call forwarding-target terminal (candidate UE) list at step S415. The call forwarding-target terminal list can be provided by the user terminal 30. That is, the call forwarding-target terminal can be the terminal of which phone number is input by the user directly. Next, the call forwarding server 200 maps the distance information to the call forwarding-target terminal list and saves the mapping and completes the distance-based call forwarding establishment process at step 417. Accordingly, when the user terminal 30 is located in the range of the radius "r" from the position "e", the call destined to the user terminal 30 is forwarded to at least one of the candidate terminals in the call forwarding-target terminal list.

Once the configuration has completed, the call forwarding server 200 notifies the user terminal 30 of the completion the call forwarding establishment by displaying the call forwarding-target terminal list at step S419.

FIG. 4 shows the procedure of configuring the call forwarding region according to an embodiment of the present invention, and the call forwarding region is the information indicating the reference region for determining whether to forward the call to the call forward target terminal or not. For example, the location information can be the space described with reference to FIGS. 5 and 5 or a predetermined distance from a reference point as described with reference to FIG. 7. Whether to perform the call forwarding can be determined by comparing the current location of the user terminal 30 with the call forwarding region.

Figure 8:
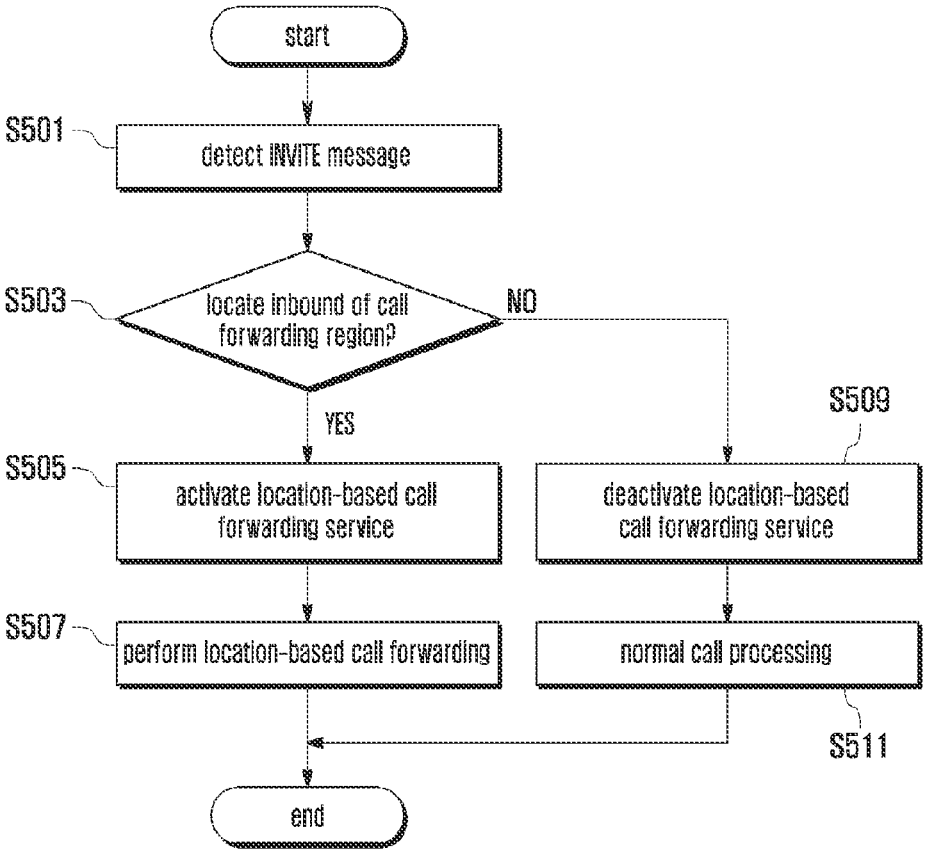
FIG. 8 is a flowchart illustrating a method for providing the location-based call forwarding service according to an embodiment of the present invention.

A description is made of the method for providing the location-based call forwarding service according to an embodiment of the preset invention. FIG. 8 is a flowchart illustrating a method for providing the location-based call forwarding service according to an embodiment of the present invention.

In FIG. 8, it is assumed that the first user terminal 31 is the calling terminal and the second user terminal 32 is the called terminal. If the first user terminal 31 sends the second user terminal 32 an INVITE message for session establishment, the call forwarding server 200 detects the INVITE message at step 501 and determines whether the second user terminal 32 is inbound of a predetermined call forwarding region at step S503. Here, the call forwarding range can be configured as described with reference FIGS. 4 to 7, and use both the space and distance-based information. That is, the call forwarding region can be the spaces A to F as depicted in FIGS. 5 and 6. The call forwarding region also can be the region defined by the radius "r" from the center position "e" as depicted in FIG. 7.

If the second user terminal 32 is inbound of the call forwarding region at step 503, the call forwarding server 200 activates the location-based call forwarding service at step 505 and then executes the location-based call forward at step S507. That is, the call forwarding server 200 establishes a session with the call forwarding-target terminal in place of the second terminal 32.

Here, the call forwarding-target terminal can be at least one of the candidate UEs registered in the call forwarding-target terminal (candidate UE) list corresponding to the current location of the second terminal 32.

The call forwarding-target terminal list can contain the user terminals located in the range of a predetermined distance from the current location of the called terminal (second user terminal). Also, the call forwarding-target terminals can be the terminals within the predetermined call forward region in which the called terminal is located. The call forwarding-target terminal list can be created according to the user setting. At this time, the call forwarding server 200 can collect the locations of the call forwarding-target terminals in the call forwarding-target terminal list from the LBS server 100 and forward the call to the terminal nearest to position "e". The call forwarding server 200 also can forward the call to the terminal having the highest priority among the candidate terminals listed in a priority order in the call forwarding-target terminal list.

If the second user terminal is not inbound of the call forwarding region at step 503, the call forwarding server 200 deactivates the location-based call forwarding service at step 509 and then executes the call processing according to a normal session establishment.

At step 503, the call forward is determined depending on whether the second user terminal is inbound of the call forwarding region. In contrast, it is possible to configure such that the call forwarding is determined when the second user terminal 32 is outbound of the call forwarding region.

As aforementioned, according to an embodiment of the present invention, it is possible to configure such that, when the called terminal is in a specific region, the call forwarding is executed automatically, resulting in user's convenience.

A description is made of the method for proving a conditional call forwarding service according to an embodiment of the present invention.

According to an embodiment of the present invention, the call forwarding condition varies according to the state of the called terminal and includes CFU (Call Forwarding Unconditional), CFNF (Call Forwarding on Not Logged-in), and CFNL (Call Forwarding on No Reply).

The CFU service is the service forwarding the call to the call forwarding-target terminal unconditionally in the call establishment process.

The CFNL service is the service forwarding the call to the call forwarding-target terminal when the called terminal is not registered with the network.

The user terminal 30 can be registered with the network according to the SIP. In short, the user terminal 30 sends a REGISTER message to the IMS server (in order of P-CSCF, I-CSCF, and S-CSCF) 400 via the base station device, and the IMS server 400 authenticates the user terminal 30 and then registers the user terminal with the HSS 300. If the user terminal 30 is authenticated and registered successfully, the IMS server 300 sends a 200 OK message to the user terminal. Otherwise, if the user terminal 30 fails authentication, the IMS server 300 sends the user a 401 Unauthorized message. If the called terminal is not registered, this means that the called terminal has received the 401 Unauthorized message or turned off.

The CFNR service is the service forwarding the call to the call forwarding-target terminal when the called terminal does not accept the call. For example, when the owner of the terminal does not answer the call, the call is forwarded to the call forwarding-target terminal.

The call forwarding service in IMS is the service provided by the call forwarding service 200 for forwarding the call destined to the called terminal to at least one call forwarding-target terminal according to the state of the called terminal which is registered and configured by the user. That is, according to the current state (e.g., Unconditional, Busy, Not logged in, and No reply) of the called terminal 30, the call destined to the called terminal is forwarded to the call forwarding-target terminal. For this purpose, the user terminal 30 provides the call forwarding server 200 with its identity information (subscriber profile, service profile, etc.) and the call forwarding-target terminal list in advance.

Figure 9:
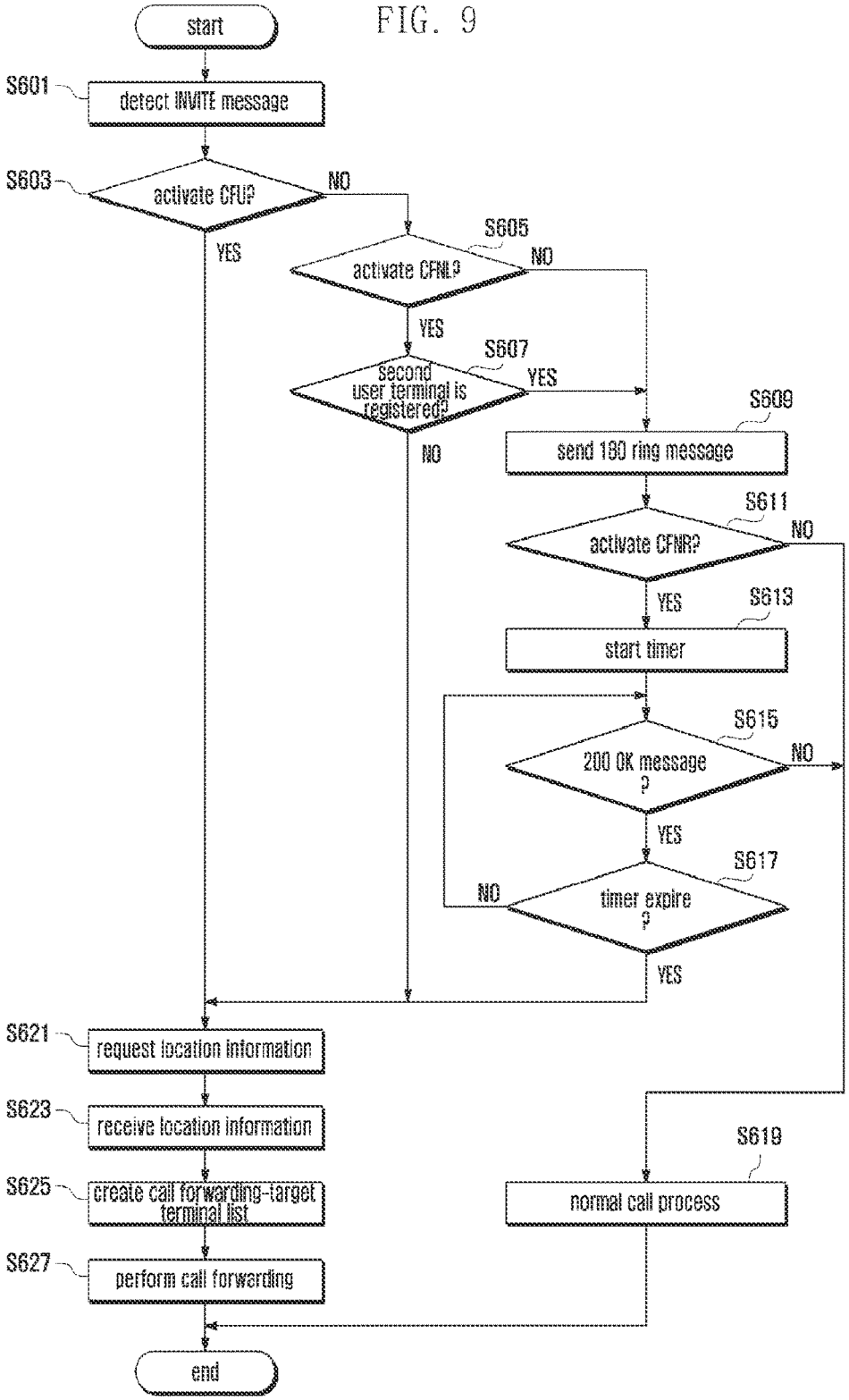
FIG. 9 is a flowchart illustrating a method for providing the call forwarding service based on the call forwarding condition according to an embodiment of the present invention.

FIG. 9 is a flowchart illustrating a method for providing the call forwarding service based on the call forwarding condition according to an embodiment of the present invention. Here, it is assumed that the first user terminal 31 is the calling terminal and the second user terminal 32 is the called terminal. Also, it is assumed that the second user terminal 32 has subscribed to all of the aforementioned CPU, CFNL, and CFNR services. The second user terminal 32 can activate at least one of the CFU, CFNL, and CFNR services according to the user setting.

Referring to FIG. 9, if the first user terminal 31 sends the second user terminal 32 an INVITE message for session establishment, the call forwarding server 200 detects the INVITE message at step S601 and then determines whether the second user terminal 32 has activated the CFU service at step S603.

If it is determined that the second user terminal 32 has activated the CFU service at step S603, the call forwarding server 200 goes to step S621 and, otherwise, step S605 to determine whether the second user terminal 32 has activated the CFNL service.

If it is determine that the second user terminal 32 has activated the CFNL service, the call forwarding server 200 goes to step S607 and, otherwise, step S609.

At step 607, the call forwarding server 200 determines whether the second user terminal 32 is registered. That is, in case of the CFNL service in which the call forwarding is executed when the second user terminal 32 is not registered with the network, the call forwarding server 200 determines whether the second user terminal 32 is registered with the network. Here, the registration of the second user terminal 32 is performed preferably according to the SIP. If it is determined that the second user terminal 32 is not registered at step S607, the call forwarding server 200 goes to step S621 and, otherwise, step S609.

If the INVITE message is received in the state where both the CFU and CFNL services are not activated, the second user terminal sends the 180 ring message. With the transmission of the 180 ring message, the first user terminal 31 outputs a ring-back tone and the second user terminal 32 a ring tone.

The call forwarding server 200 detects the 180 ring message at step S609 and goes to step S611. At step 611, the call forwarding server 200 determines whether the second user terminal 32 has activated the CFNR service.

If it is determined that the second user terminal 32 has activated the CFNR service, the call forwarding server 200 starts a timer at step S613. Here, the timer is used to determine whether the reply (call accept) is made in a predetermined time. That is, the timer is used for determining whether the 200 OK indicating call accept is sent by the second user terminal 32 before the expiry of the timer.

Accordingly, the call forwarding server 200 determines whether the 200 OK message is sent before the expiry of the timer at step S615. If it is determined that the 200 OK message has been sent at step S615, the call forwarding server 200 performs a session establishment according to a normal call process at step S619.

If it is determined that no 200 OK message has been sent at step S615, the call forwarding server 200 determines whether the timer has expired at step S617. If it is determined that the timer has expired at step S617, the call forwarding server 200 goes to step S621 and, otherwise, step S615.

As aforementioned, when the second user terminal 32 has activated one of the CFU, CFNL, and CFNR services, the call forwarding server 200 requests for the location information according to the activated service at step S621.

In order to provide the call forwarding service, the call forwarding server 200 requests the LBS server 100 for the location information of the second user terminal 32 at step S621 and acquires the location information of the second user terminal 32 at step S623.

Next, the call forwarding server 200 creates the call forwarding-target terminal (candidate UE) list with the location information of the second user terminal 32 at step 625. The call forwarding server 200 can create the call forwarding-target terminal list using at least one of the three methods: The call forwarding-target terminal list can be composed of the user terminals located within a range defined a distance from the current location of the called terminal (second user terminal). The call forwarding-target terminal list also can be composed of the user terminals within a predetermined area where the called terminal is located. The call forwarding-target terminal list also can be built according to the user setting.

Next, the call forwarding server 200 performs call forwarding to at least one of the candidate terminals in the call forwarding-target terminal list at step S627. In order to forward the call, the call forwarding can be performed by attempting call establishment to the candidate terminals in the nearest first-order to the called terminal 30. Also, the call forwarding can be performed by attempting call establishment to all the candidate terminal simultaneously and in order of quickest reply-first order to the called terminal 30.

Although the description has been directed to the case where the call forwarding is performed according to the location or state of the called terminal with reference to FIGS. 8 and 9, the call forwarding can be determined in consideration of both the position and state of the called terminal 30.

In the above described embodiment, the call forwarding is performed based on the location and state of the called terminal. According to other embodiments of the present invention, the call forwarding can be performed based on the location of the user.

As shown in FIG. 1, it is assumed that the RFID sensor 60 is carried by the user. In this case, the LBS server 100 can collects the location information of the user via the RFID reader 50 and the USN 40. Assuming that the user terminal is the called terminal, it is assumed that the call forwarding is determined according to the location and state of the called terminal. Accordingly, the call forwarding server 200 can forward the call to the user terminal nearest to the called terminal among the candidate terminals in the call forwarding-target terminal list.

As described above, the location-based call forwarding method and apparatus of the present invention determines call forwarding based on the state or location of the called terminal and selects the call forwarding-target terminal according to the location of the called terminal, thereby providing the call forwarding service more efficiently. As a consequence, it is possible to improve the utilization of the wireless communication network.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A location-based call forwarding method of a call forwarding server in a wireless communication network, the method comprising:

determining, when a first terminal sends a call request [for at least one] *to a* second terminal for a call establishment, [whether] *that* the second terminal [accepts] *does not accept* the request [or not];

acquiring [a] location information of the second terminal and [a] space information of the second terminal [when] *in response to* the second terminal [does] not [accept] *accepting* the request;

creating a candidate terminal list, comprising at least one candidate terminal located in a same space, based on the location information of the second terminal and the space information of the second terminal; and forwarding the call request to [at least] one [of the] *or more* candidate terminals *in the candidate terminal list*.

2. The method of claim 1, wherein the forwarding comprises attempting call establishment to the [at least] one *or more* candidate [terminal] *terminals* in a nearest first order to the second terminal.

3. The method of claim 1, wherein the forwarding comprises attempting call establishment to all *of* the *one or more* candidate terminals simultaneously, and establishing calls in an order of quickest reply first order to the second terminal.

4. The method of claim 1, [wherein the determining] further [comprises] *comprising* starting a timer used to determine [whether] *that* the call [accept] *request* is [made] *not accepted* in a predetermined time.

5. The method of claim 1, wherein the candidate terminal list *further* comprises [one of] *a* user [terminals] *terminal* within a range defined by a distance from a current location of the second terminal [and user terminals within a predetermined area in which the second terminal is located].

6. A location-based call forwarding apparatus of a wireless communication network, the apparatus comprising:

a location processor *configured to:*

[for determining] *determine*, when a first terminal sends a call request [for at least one] *to a* second terminal for a call establishment, whether the second terminal accepts the *call* request or not,

[acquiring a] *acquire* location information of the second terminal and [a] space information of the second terminal [when] *in response to* the second terminal [does] not [accept] *accepting* the [requests] *request*, and

[creating] *create* a candidate *terminal* list comprising at least one candidate terminal, located in a same space, based on the location information of the second terminal and the space information of the second terminal; and a call processor [for forwarding] *configured to forward* the call request to [at least] one [of the] *or more* candidate terminals *in the candidate terminal list*.

7. The apparatus of claim 6, wherein the call processor attempts call establishment to the [at least] one *or more* candidate [terminal] *terminals* in a nearest first order to the second terminal.

8. The apparatus of claim 6, wherein the call processor attempts call establishment to all *of* the *one or more* candidate terminals simultaneously, and establishes calls in an order of quickest reply first order to the second terminal.

9. The apparatus of claim 6, wherein the call processor starts a timer used to determine whether the call [accept] *request* is [made] *accepted* in a predetermined time [when determining whether the second terminal accepts the request or not].

10. The apparatus of claim 6, wherein the candidate terminal list *further* comprises [one of] *a* user [terminals] *terminal* within a range defined by a distance from a current location of the second terminal [and user terminals within a predetermined area where the second terminal is located].

*11. A location-based call forwarding method of a call forwarding server in a wireless communication network, the method comprising:*

*sending, by a first terminal, a call request to a second terminal for a call establishment;*

*determining that the second terminal does not accept the call request;*

*in response to the second terminal not accepting the call request, acquiring space information of the second terminal, wherein the space information corresponds to a specific space in which the first terminal is located among a plurality of spaces predetermined according to an internal structure of a room;*

*creating a candidate terminal list, comprising at least one candidate terminal located in a same space, based on the space information of the second terminal; and*

*forwarding the call request to one or more candidate terminals in the candidate terminal list.*

*12. The method of claim 11, wherein the forwarding comprises attempting call establishment to the one or more candidate terminals in a nearest first order to the second terminal.*

*13. The method of claim 11, wherein the forwarding comprises attempting call establishment to all of the one or more candidate terminals simultaneously, and establishing calls in an order of quickest reply first order to the second terminal.*

*14. The method of claim 11, further comprising starting a timer used to determine that the call request is not accepted in a predetermined time.*

*15. The method of claim 11, wherein the candidate terminal list further comprises a user terminal within a range defined by a distance from a current location of the second terminal.*

*16. A location-based call forwarding apparatus of a wireless communication network, the apparatus comprising:*

*a first processor configured to:*

*determine, when a first terminal sends a call request to a second terminal for a call establishment, whether the second terminal accepts the call request or not,*

*acquire space information of the second terminal in response to the second terminal not accepting the call request, wherein the space information corresponds to a specific space in which the first terminal is located among a plurality of spaces predetermined according to an internal structure of a room, and*

*create a candidate terminal list comprising at least one candidate terminal, located in a same space, based on the space information of the second terminal; and*

*a second processor configured to forward the call request to one or more candidate terminals in the candidate terminal list.*

*17. The apparatus of claim 16, wherein the second processor is further configured to attempt call establishment to the one or more candidate terminals in a nearest first order to the second terminal.*

*18. The apparatus of claim 16, wherein the second processor is further configured to attempt call establishment to all of the one or more candidate terminals simultaneously, and to establish calls in an order of quickest reply first order to the second terminal.*

*19. The apparatus of claim 16, wherein the second processor is further configured to start a timer used to determine whether the call request is accepted in a predetermined time.*

*20. The apparatus of claim 16, wherein the candidate terminal list further comprises a user terminal within a range defined by a distance from a current location of the second terminal.*

* * * * *